(12) United States Patent
Jang et al.

(10) Patent No.: US 9,117,397 B2
(45) Date of Patent: Aug. 25, 2015

(54) TIMING CONTROLLER, DRIVING METHOD THEREOF, AND FLAT PANEL DISPLAY DEVICE USING THE SAME

(71) Applicant: LG DISPLAY CO., LTD., Seoul (KR)

(72) Inventors: Su Hyuk Jang, Paju-si (KR); Chang Gone Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 409 days.

(21) Appl. No.: 13/727,317

(22) Filed: Dec. 26, 2012

(65) Prior Publication Data

US 2014/0085319 A1  Mar. 27, 2014

(30) Foreign Application Priority Data

Sep. 25, 2012 (KR) .................. 10-2012-0106455

(51) Int. Cl.
| | |
|---|---|
| *G09G 3/20* | (2006.01) |
| *G09G 3/36* | (2006.01) |
| *G09G 5/00* | (2006.01) |
| *H04N 9/804* | (2006.01) |
| *H04N 21/4402* | (2011.01) |
| *G09G 5/02* | (2006.01) |

(52) U.S. Cl.
CPC ............ *G09G 3/2003* (2013.01); *G09G 3/3607* (2013.01); *G09G 3/3611* (2013.01); *G09G 5/005* (2013.01); *G09G 5/02* (2013.01); *G09G 2300/0452* (2013.01); *G09G 2310/0281* (2013.01); *G09G 2340/02* (2013.01); *G09G 2340/06* (2013.01); *G09G 2350/00* (2013.01); *G09G 2370/08* (2013.01); *H04N 9/8042* (2013.01); *H04N 21/4402* (2013.01)

(58) Field of Classification Search
None
See application file for complete search history.

(56) References Cited

U.S. PATENT DOCUMENTS

| | | | | |
|---|---|---|---|---|
| 4,727,425 | A | * | 2/1988 | Mayne et al. ................ 358/523 |
| 2002/0021834 | A1 | * | 2/2002 | Kojima et al. ............... 382/164 |
| 2004/0246275 | A1 | | 12/2004 | Yoshihara et al. |
| 2007/0200807 | A1 | * | 8/2007 | Lee et al. ....................... 345/88 |
| 2007/0222743 | A1 | | 9/2007 | Hirakata |
| 2009/0030960 | A1 | * | 1/2009 | Geraghty et al. ............ 708/203 |

(Continued)

FOREIGN PATENT DOCUMENTS

| | | |
|---|---|---|
| KR | 10-2007-0088000 A | 8/2007 |
| KR | 10-2010-0012258 A | 2/2010 |
| TW | 201205544 A1 | 2/2012 |

OTHER PUBLICATIONS

Wikipedia, "Offset binary", 20111030.*

*Primary Examiner* — Mark Zimmerman
*Assistant Examiner* — Yu-Jang Tswei
(74) *Attorney, Agent, or Firm* — Birch, Stewart, Kolasch & Birch, LLP

(57) ABSTRACT

Provided are a timing controller for converting RGB data to WRGB data, a driving method thereof, and an LCD device using the same. The timing controller according to an embodiment includes a reception unit to receive input RGB data from an external device; a converter to convert the input RGB data into input WRGB data composed of W, R, G and B data; an aligner to convert one of the W, R, G, and B data into 0 to generate conversion WRGB data, the conversion WRGB data having bits less than the total number of bits composing the W, R, G, and B data; a controller to transfer the conversion WRGB data to an external memory; and a re-aligner to convert the conversion WRGB data received from the external memory into digital WRGB data corresponding to the input WRGB data, and to output the digital WRGB data.

18 Claims, 7 Drawing Sheets

(56) References Cited

U.S. PATENT DOCUMENTS

| | | |
|---|---|---|
| 2010/0020112 A1 | 1/2010 | Jeon et al. |
| 2012/0026203 A1 | 2/2012 | Liu et al. |
| 2013/0083047 A1* | 4/2013 | Shamarao et al. ............ 345/547 |
| 2013/0322746 A1* | 12/2013 | Cote et al. .................... 382/163 |

* cited by examiner (A)  (B)  (C)

TIMING CONTROLLER, DRIVING METHOD THEREOF, AND FLAT PANEL DISPLAY DEVICE USING THE SAME

CROSS-REFERENCE TO RELATED APPLICATIONS

This application claims the priority benefit of the Korean Patent Application No. 10-2012-0106455 filed on Sep. 25, 2012 in the Republic of Korea, which is hereby incorporated by reference as if fully set forth herein.

BACKGROUND

1. Field of the Invention

The present invention relates to a timing controller and a liquid crystal display (LCD) device using the same, and more particularly, to a timing controller for receiving RGB data to output WRGB data, a driving method thereof, and an LCD device using the same.

2. Discussion of the Related Art

With the advancement of various portable electronic devices such as mobile phones, personal digital assistants (PDAs), and notebook computers, the demands for Flat Panel Display (FPD) devices applicable to the portable electronic devices are increasing.

LCD devices, plasma display panels (PDPs), field emission display (FED) devices, and light emitting display devices are considered FPD devices.

In such FPD devices, LCD devices are devices that display an image using the optical anisotropy of liquid crystal. Since the LCD devices have a thin thickness, a small size, and low power consumption and realize a high-quality, the LCD devices are widely used.

FIG. 1 is an exemplary diagram illustrating a communication method between an external memory 500 and a timing controller 40 applied to a related art LCD device. FIG. 2 is an exemplary diagram illustrating a data timing for transmitting and receiving WRGB data between the external memory 500 and the timing controller 40 applied to the related art LCD device.

The related art LCD device includes the timing controller 40, a source driver IC, a gate driver IC, and a panel. Generally, the timing controller 40 is mounted on a main board connected to a flexible printed circuit board (FPCB). In addition to the timing controller 40, various electronic components are mounted on the timing controller 40. The external memory 500, which temporarily stores data transmitted from the timing controller 40 and transmits the data to the timing controller 40, is also mounted on the main board.

Generally, the panel of the related art LCD device includes a plurality of red (R) sub-pixels, green (G) sub-pixels, and blue (B) sub-pixels for realizing colors. To this end, input RGB data are inputted from an external system (for example, a television set) to the timing controller 40 of the related art LCD device.

An LCD device, having a WRGB pixel structure that includes both RGB sub-pixels having three primary colors and a white (W) sub-pixel transmitting white light, is recently developed for enhancing luminance of LCD devices.

The LCD device having the WRGB sub-pixel structure converts input RGB data, inputted from the external system, into digital WRGB data and converts the digital WRGB data into analog WRGB signals to output the WRGB signals through the panel. A function of converting the input RGB data into the WRGB data is performed by the timing controller 40.

In this process, the WRGB data is required to be temporarily stored in the external memory 500, in order for the timing controller 40 to convert the input RGB data into the WRGB data and output the WRGB data, and/or to perform a conversion operation (correction of image, removal of noise, compensation for image quality, etc.) on the WRGB data. That is, in order for the converted WRGB data from the timing controller 40 to be sequentially outputted to the source driver IC, the WRGB data needs to be temporarily stored in the external memory 500.

As described above, the external memory 500 is required to be driven at a high speed, for storing the WRGB data in the external memory 500. That is, a high-speed external memory clock (Ext Mem. CLK) is necessary for transmitting and receiving 16-bit data between the timing controller 40 and the external memory 500 according to the related LCD device. However, such a high-speed external memory clock exceeds the specification of the external memory 500 applied to the related art LCD device. Therefore, in the related art LCD device, the external memory 500 is unable to transmit and receive data with the high-speed external memory clock.

For example, as shown in FIG. 1, when each of RGB data applied to the related art LCD device is composed of 10 bits, and the external system and the timing controller 40 are connected with four ports, 120-bit RGB data are inputted to the timing controller 40. To this end, the external system and the timing controller 40 need a data clock driven at 40 MHz to 85 MHz. Then, the 10-bit data are transmitted from the external system to the timing controller 40 with one piece of data clock driven at 40 MHz to 85 MHz.

Since the WRGB data generated by the timing controller 40 are composed of a total of 40 bits (=10 bits×4), and the timing controller 40 and the external memory 500 communicate with each other through the four ports, 160-bit WRGB data are then transmitted and received between the timing controller 40 and the external memory 500.

In this case, since 16-bit data are transmitted and received between the timing controller 40 and the external memory 500, ten data clocks are necessary for transmitting and receiving the 160-bit WRGB data. The timing controller 40 and the external memory 500 transmit and receive data through two lines, and thus, five data clocks are actually required.

Therefore, as shown in FIG. 2, the external memory 500 is required to be driven at a frequency of 200 MHz (=40 MHz× 5) to 425 MHz (=85 MHz×5) that enables transmission of the five data clocks.

However, the external memory 500 (for example, DDR2) instead uses a frequency of 400 MHz as a memory clock at present. For this reason, in the related art LCD device using the external memory 500, the WRGB data outputted from the timing controller 40 are not properly inputted to the external memory 500, or the WRGB data are not properly outputted from the external memory 500 to the timing controller 40, which is a limitation that needs to be addressed.

To provide an additional description, in the related art LCD device using the WRGB pixel structure, the input RGB data are converted into the WRGB data, which undergo a conversion operation using various algorithms, and are displayed as an image through the panel. In this case, an internal memory (for example, SRAM) included in the timing controller 40 and the external memory 500 (external frame memory) disposed outside the timing controller 40 are used. The internal memory is disposed at a front end of a memory control unit of the timing controller 40 communicating with the external memory 500, or the internal memory is disposed at a rear end of the memory control unit. However, when each of input RGB data is composed of 120 bits, it is unable to apply the 120-bit RGB data to the related art external memory 500 that transmits and receives 16-bit data. That is, since an external memory clock of 200 MHz to 425 MHz in the timing controller 40, which is used for receiving WRGB data into which input RGB data driven at 85 MHz have been converted, exceeds the specification (400 MHz) of the external memory 500, the timing controller 40 is unable to apply the data to the external memory 500.

Further the above-described limitations occur in different types of flat panel display devices using the timing controller 40 and the external memory 500, in addition to the LCD devices.

Moreover, the external memory 500 generally has a fixed frequency (400 MHz) and a data clock is variable. Therefore, if the design of the external memory 500 is changed to be driven at a different frequency each time the frequency of the external memory 500 needs to be changed because, as described above, the amount of data transmitted/received between the timing controller 40 and the external memory 500 is changed, or the data clock is changed, then the manufacturing cost of such flat panel display devices would increase inevitably.

SUMMARY

Accordingly, the present invention is directed to a timing controller, a driving method thereof, and an LCD device using the same that substantially obviate one or more problems due to limitations and disadvantages of the related art.

An aspect of the present invention is directed to provide a timing controller, a driving method thereof, and an LCD device using the same, which convert input RGB data into input WRGB data, generate conversion WRGB data including a plurality of data (which are generated by converting one of W, R, G, and B data composing the input WRGB data into 0) and location information of the data which has been converted into 0, and transfer the conversion WRGB data to an external memory.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a timing controller including: a reception unit receiving input RGB data from an external system; a converter converting the input RGB data into input WRGB data; an aligner converting one of W, R, G, and B data, composing the input WRGB data, into 0 to generate conversion WRGB data having bits less than the total number of bits composing the W, R, G, and B data; a controller transferring the conversion WRGB data to the external memory; and a re-aligner converting the conversion WRGB data, transferred from the external memory, into WRGB data corresponding to the input WRGB data, and outputting the converted WRGB data.

In another aspect of the present invention, there is provided a method of driving a timing controller including: receiving input RGB data and a timing signal from an external system; converting the input RGB data into input WRGB data; converting one of W, R, G, and B data, composing the input WRGB data, into 0 to generate conversion WRGB data having bits less than the total number of bits composing the W, R, G, and B data; transferring the conversion WRGB data to the external memory; and converting the conversion WRGB data, transferred from the external memory, into WRGB data corresponding to the input WRGB data, and outputting the converted WRGB data.

In another aspect of the present invention, there is provided a flat panel display device including: the timing controller; an external memory receiving and storing WRGB data from the timing controller, or transferring the stored WRGB data to the timing controller; a panel, a plurality of data lines and gate lines being formed in the panel; at least one or more source driver ICs converting the WRGB data, transferred from the timing controller, into analog WRGB image signals and respectively outputting the WRGB image signals to the data lines; and at least one or more gate driver ICs generating a scan signal with a control signal transferred from the timing controller, and sequentially outputting the scan signal to the gate lines.

According to an embodiment, the present invention provides a timing controller for use in a display device including an external memory, the timing controller comprising: a reception unit configured to receive input RGB data from an external device; a converter configured to convert the input RGB data into input WRGB data composed of W, R, G and B data; an aligner configured to convert one of the W, R, G, and B data of the input WRGB data into 0 to generate conversion WRGB data, the conversion WRGB data having bits less than the total number of bits composing the W, R, G, and B data; a controller configured to transfer the conversion WRGB data to the external memory; and a re-aligner configured to receive the conversion WRGB data from the external memory, convert the received conversion WRGB data into digital WRGB data corresponding to the input WRGB data, and to output the digital WRGB data.

According to an embodiment, the present invention provides a timing controller for use in a display device including an external memory, the timing controller comprising: a reception unit configured to receive input RGB data from an external device; a converter configured to convert the input RGB data into input WRGB data composed of W, R, G and B data each having N bits, where N is a positive integer; an aligner configured to convert the input WRGB data into conversion WRGB data, the conversion WRGB data having a total of ((3×N)+2) bits; a controller configured to transfer the conversion WRGB data to the external memory; and a re-aligner configured to receive the conversion WRGB data from the external memory, convert the received conversion WRGB data into digital WRGB data corresponding to the input WRGB data, and to output the digital WRGB data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 3:
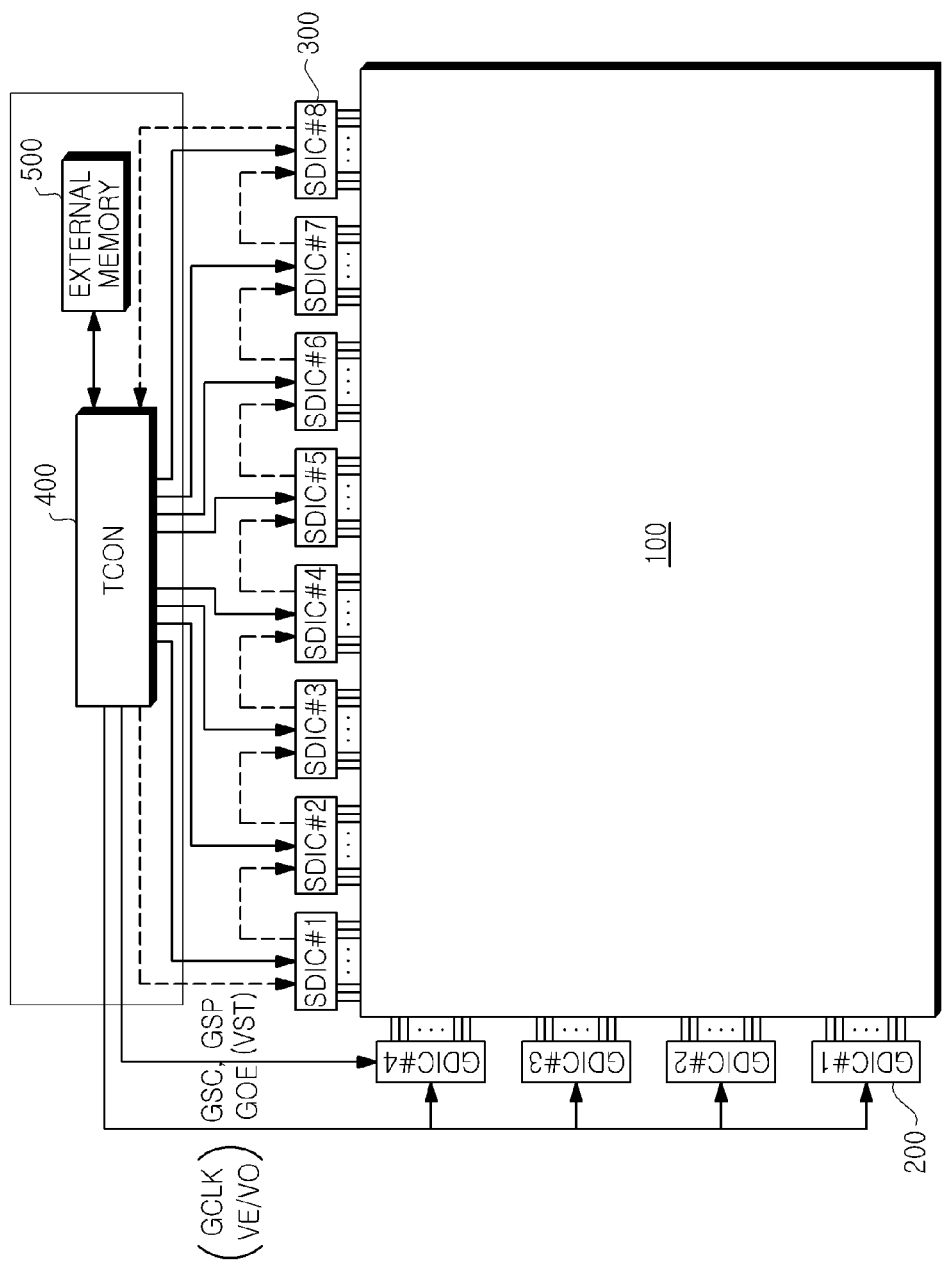
FIG. 3 is an exemplary diagram illustrating a configuration of an LCD device using a timing controller according to an embodiment of the present invention.

FIG. 3 is an exemplary diagram illustrating a configuration of an LCD device using a timing controller according to an embodiment of the present invention.

A timing controller 400 according to the present invention may be applied to LCD devices including a panel driven with WRGB data into which input RGB data have been converted, and to organic light emitting diode (OLED) display devices including a panel driven with the WRGB data. Hereinafter, for convenience of a description, an LCD device will be described as an example of a flat panel display device according to the present invention. However the features of the present invention are applicable to other types of flat panel display devices.

Figure 1:
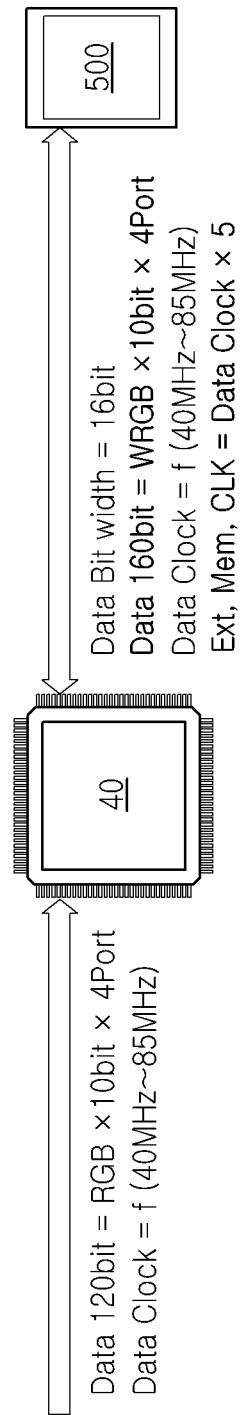
FIG. 1 is an exemplary diagram illustrating a communication method between an external memory and a timing controller applied to a related art LCD device.
Figure 2:
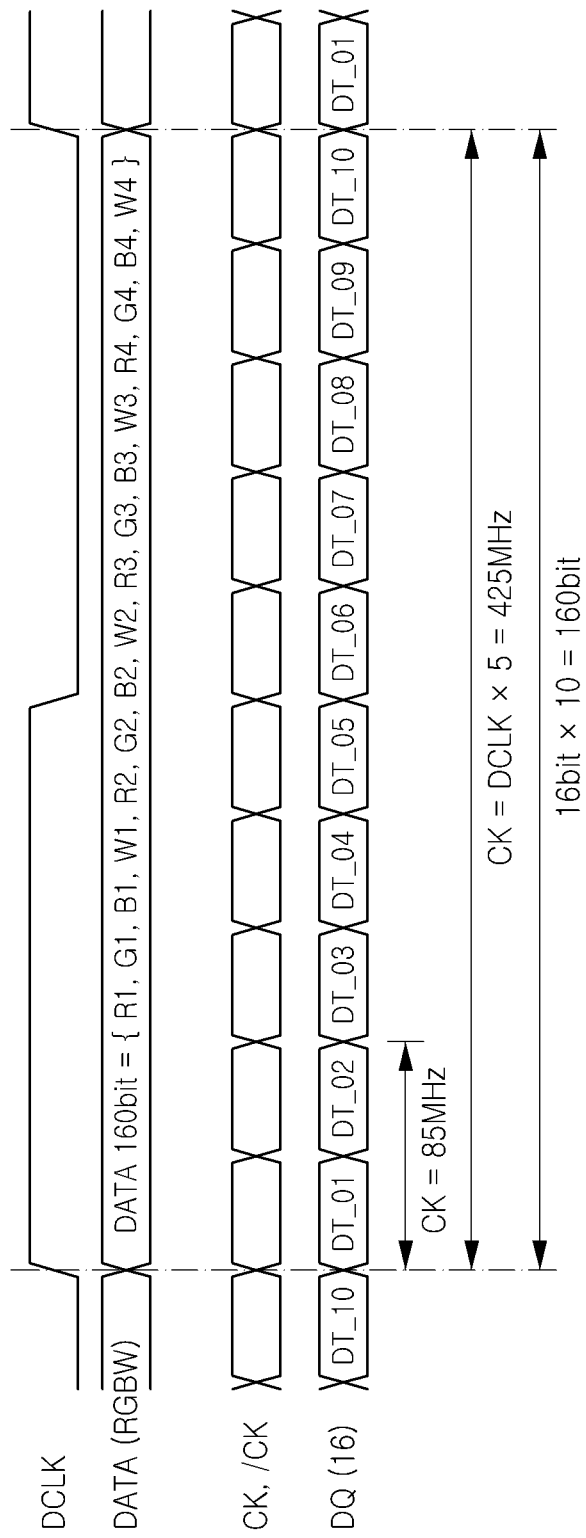
FIG. 2 is an exemplary diagram illustrating a data timing for transmitting and receiving WRGB data between the external memory and the timing controller of FIG. 1.

The LCD device according to an embodiment of the present invention, as illustrated in FIG. 3, includes: a panel 100; at least one or more gate driver ICs (GDIC#1 to GDIC#4) 200 for driving a plurality of gate lines formed in the panel 100; at least one or more source driver ICs (SDIC#1 to SDIC#8) 300 for driving a plurality of data lines formed in the panel 100; a timing controller 400 for controlling the gate driver ICs 200 and the source driver ICs 300; and an external memory 500 for storing WRGB data (conversion WRGB data) transferred from the timing controller 400 and transferring the stored WRGB data to the timing controller 400. The external memory 500 can be the same as the external memory 500 of FIG. 1 or can be any other external memory.

The panel 100 includes a plurality of pixels each formed in each of areas defined by respective intersections between the gate lines and the data lines, and includes thin film transistors (TFTs) and pixel electrodes connected respectively to the TFTs.

Each TFT supplies an image signal, transferred from a corresponding data line, to the corresponding pixel electrode in response to a scan signal supplied from a corresponding gate line. In response to the image signal, the pixel electrode drives liquid crystal disposed between the pixel electrode and a common electrode provided in the panel 100, thereby adjusting light transmittance.

A liquid crystal mode of the panel applied to the present invention may be implemented as various liquid crystal modes such as a TN mode, a VA mode, an IPS mode, an FFS mode, etc. Also, the LCD device according to the present invention may be a transmissive LCD device, a semi-transmissive LCD device, a reflective LCD device, or the like.

Especially, the panel 100 applied to the present invention has a WRGB pixel structure. Specifically, in order to enhance the luminance of the LCD device, the panel 100 applied to the present invention additionally includes a W sub-pixel transmitting white light, in addition to RGB sub-pixels having three primary colors. Here, the WRGB pixel structure may be formed in various types.

The timing controller 400 generates a gate control signal GCS for controlling the operation timing of the gate driver ICs 200 and a data control signal DCS for controlling the operation timing of the source driver ICs 300 with a timing signal (e.g., a vertical sync signal Vsync, a horizontal sync signal Hsync, and a data enable signal DE, etc.) inputted from an external system/device, and generates digital WRGB data to be transferred to the source driver ICs 300. An example of the external device may be a television set, a computer notebook, a smart phone, a smart device, or any other electronic device that needs a displaying operation.

The timing controller 400 and the source driver IC 300 communicate with each other in various types such as an embedded clock point-point interface (EPI) type and a mini-LVED type. Hereinafter, as illustrated in FIG. 3, an LCD device using the EPI type will be described as an example of the present invention.

The timing controller 400 according to an embodiment of the present invention converts input RGB data, transferred from the external system, into digital WRGB data according to the WRGB pixel structure of the panel 100, and transfers the digital WRGB data to the source driver ICs 300. During this process, in order to sequentially transfer the digital WRGB data to the source driver ICs 300, the timing controller 400 temporarily stores conversion WRGB data (which are the data to which the input RGB data have been converted) into the external memory 500. The timing controller 400 also receives the stored conversion WRGB data from the external memory 500 and thereby generates the digital WRGB data to be output to the source driver ICs 300.

The detailed configuration and function of the timing controller 400 according to an embodiment of the present invention will be described in detail with reference to FIGS. 4 to 7.

Each of the gate driver ICs (GDIC#1 to GDIC#4) 200 supplies the scan signal to the gate lines with gate control signals GCS generated by the timing controller 400. That is, as an example only, the gate driver IC 200 applied to the present invention may be the same as a gate driver IC applied to the related art LCD device. The gate driver IC 200, as illustrated in FIG. 3, may be provided independently from the panel 100, and electrically connected to the panel 100 in various types. However, as another example, the gate driver IC 200 may be provided in a gate-in panel (GIP) type in which a gate driver IC is disposed inside a panel.

The source driver IC 300 converts the digital WRGB data, transferred from the timing controller 400, into analog WRGB image signals and supplies the analog WRGB image signals for one horizontal line to the data lines in units of one horizontal period for which the scan signal is supplied to one gate line. In detail, the source driver IC 300 converts the digital WRGB data into the analog WRGB image signals with gamma voltages supplied from a gamma voltage generator, and outputs the WRGB image signals to the data lines of the panel 100. To this end, each source driver IC 300 can include a shift register, a latch, a digital-to-analog converter (DAC), and an output buffer. As an example only, the source driver IC 300 applied to the present invention may be the same as a source driver IC applied to the related art LCD device using the EPI type.

The external memory 500 temporarily stores the conversion WRGB data transferred from the timing controller 400, and sequentially transfers the stored conversion WRGB data to the timing controller 400.

Figure 4:
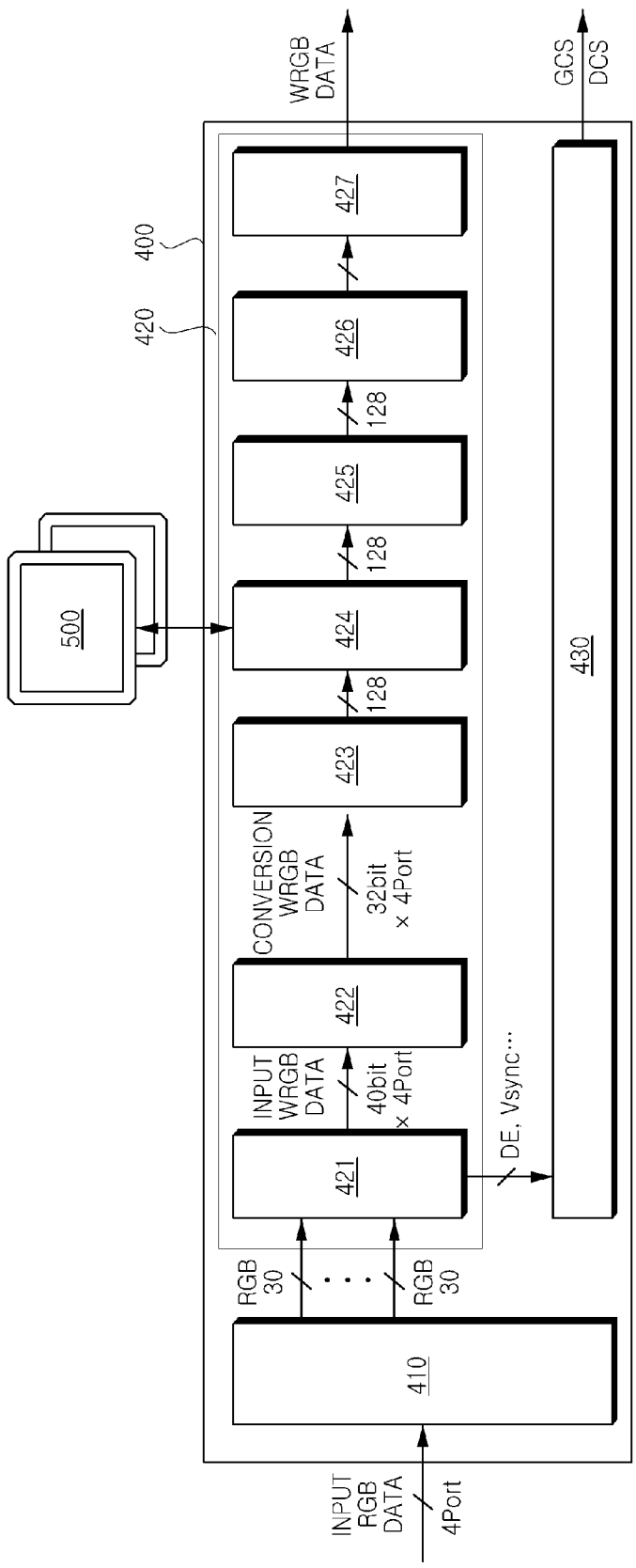
FIG. 4 is an exemplary diagram illustrating in detail an internal configuration of the timing controller according to an embodiment of the present invention.
Figure 5:
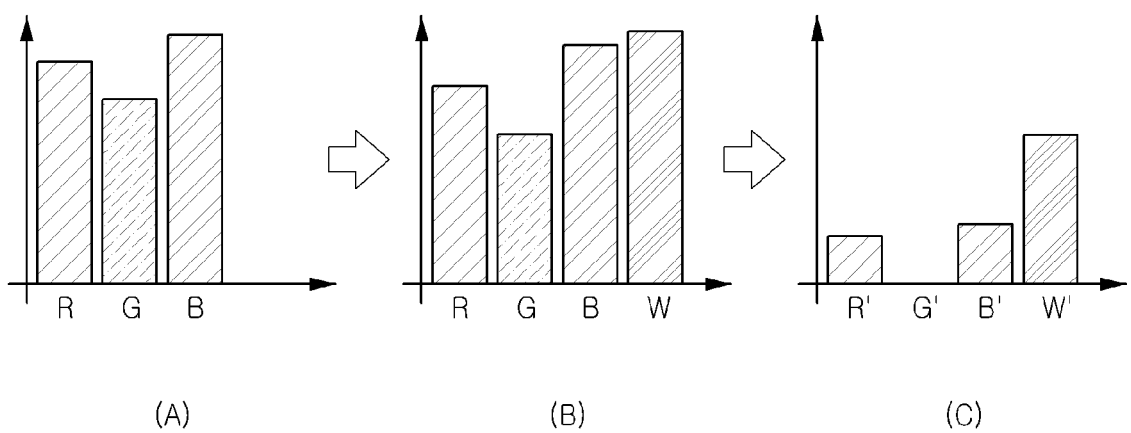
FIG. 5 is an exemplary diagram for describing a method in which the timing controller according to an embodiment of the present invention converts input RGB data into conversion WRGB data.
Figure 6:
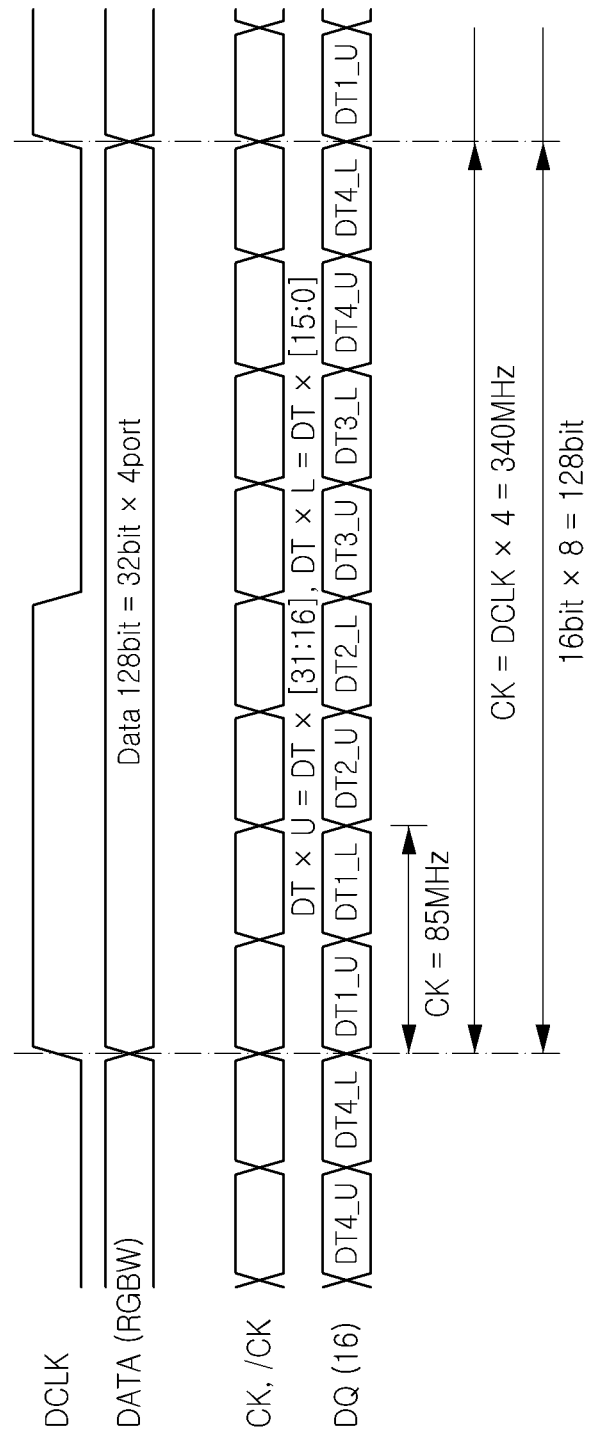
FIG. 6 is an exemplary diagram showing a data timing for transmitting and receiving the conversion WRGB data between the timing controller according to an embodiment of the present invention and an external memory.
Figure 7:
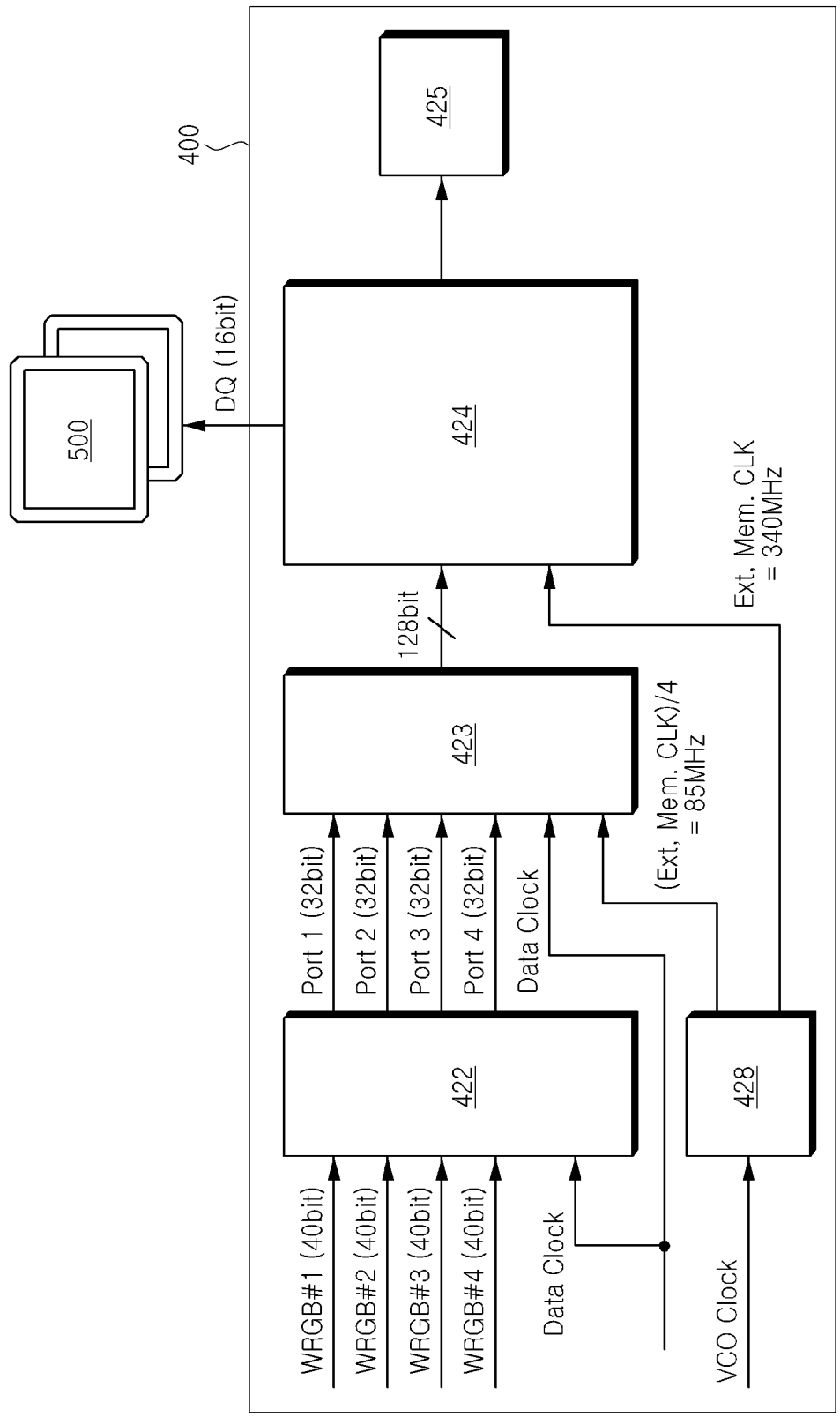
FIG. 7 is another exemplary diagram illustrating in detail an internal configuration of the timing controller according to an embodiment of the present invention.

FIG. 4 is an exemplary diagram illustrating in detail an internal configuration of the timing controller according to an embodiment of the present invention, and illustrates the internal configuration of the timing controller 400 of FIG. 3. FIG. 5 is an exemplary diagram for describing a method in which the timing controller according to the present invention converts input RGB data into conversion WRGB data. FIG. 6 is an exemplary diagram showing a data timing for transmitting and receiving the conversion WRGB data between the timing controller according to the present invention and an external memory. FIG. 7 is another exemplary diagram illustrating in detail an internal configuration of the timing controller according to the present invention, and shows the number of bits transferred by port.

The present invention can optimize a data path inside the timing controller 400 using WRGB data, decrease the size of the internal memory (internal SRAM) of the timing controller 400, and reduce a communication frequency being used or needed between the timing controller 400 and the external memory 500.

Especially, the timing controller 400 according to the present invention receives input RGB data from the external system to output conversion WRGB data to the external memory 500, thereby optimizing a moving path of the WRGB data and reducing the communication frequency of the external memory 500.

In the flat panel display device according to the present invention, the external memory 500 is used for decreasing the size of the internal memory (internal SRAM) of the timing controller 400, thus reducing a communication frequency used or needed between the timing controller 400 and the external memory 500.

To this end, as illustrated in FIG. 4, the timing controller 400 according to the present invention includes: a reception unit 410 that receives the input RGB data from the external system; a data alignment unit 420 that converts the input RGB data into input WRGB data, converts the input WRGB data using various algorithm into conversion WRGB data, outputs the conversion WRGB data to the external memory 500 for storage therein or reads the stored conversion WRGB data from the external memory 500, and converts the conversion WRGB data retrieved from the external memory 500 into digital WRGB data corresponding to the input WRGB data for outputting the digital WRGB data to the source driver ICs 300; and a control signal generation unit 430 that generates the gate control signal GCS and the data control signal DCS with the timing signal transferred from the data alignment unit 420.

The reception unit 410 receives the input RGB data and the timing signal (e.g., Vsync, Hsync, DE) from the external system, and transfers the input RGB data to the data alignment unit 420. The timing signal received through the reception unit 410 may be directly transferred from the reception unit 410 to the control signal generation unit 430, or transferred to the control signal generation unit 430 through the data alignment unit 420.

The reception unit 410 receives the input RGB data from the external system through at least two or more communication ports. Hereinafter, for convenience of a description, a case using four communication ports will be described as an example of the present invention.

The input RGB data are composed of R data, G data, and B data. Each of the R data, G data, and B data may have a various number of bits. Hereinafter, for convenience of a description, a case in which the number of bits of the R data, G data or B data is 10 will be described as an example of the present invention.

The control signal generation unit 430 may be a general control signal generation unit of the related art LCD device, and thus, its detailed description is not provided.

The data alignment unit 420, as described above, processes the input RGB data to generate the digital WRGB data and outputs the digital WRGB data to the source driver ICs 300. To this end, as illustrated in FIG. 4, the data alignment unit 420 includes: a converter 421 that converts the input RGB data into input WRGB data; an aligner 422 that converts one of W, R, G, and B data composing the input WRGB data into 0 to generate conversion WRGB data having the number of bits that is less than the total number of bits composing the W, R, G, and B data of the input WRGB data; a controller 424 that transfers the conversion WRGB data to the external memory 500 for temporarily storing the conversion WRGB data therein; a re-aligner 426 that realigns or converts the conversion WRGB data retrieved from the external memory 500 into digital WRGB data corresponding to the input WRGB data, and outputs the converted WRGB data (the digital WRGB data) to a transmitter 427; a front internal memory 423 that is disposed between the aligner 422 and the controller 424, receives the conversion WRGB data corresponding to the number of communication ports between the external system and the reception unit 410 from the aligner 422, stores the received conversion WRGB data, and transfers the stored conversion WRGB data to the controller 424; a rear internal memory 425 that is disposed between the controller 424 and the re-aligner 426, receives the conversion WRGB data corresponding to the number of communication ports between the external system and the reception unit 410 from the controller 424, stores the received conversion WRGB data, and transfers the stored conversion WRGB data to the re-aligner 426; and the transmitter 427 that transfers the re-aligned WRGB data (the digital WRGB data) outputted from the re-aligner 426 to the source driver IC 300.

The converter 421 converts the input RGB data into the input WRGB data. The input RGB data, as shown in a portion (A) of FIG. 5, include R data, G data, and B data. The converter 421, as shown in a portion (B) of FIG. 5, converts the input RGB data into the input WRGB data including W data, R data, G data, and B data.

A method of converting the input RGB data into the input WRGB data may use known general methods which are used at present, and thus, its detailed description is not provided.

The input WRGB data are composed of W, R, G and B data. The aligner 422 then converts one of the W, R, G, and B data of the input WRGB data into 0 and converts the other remaining data of the input WRGB data into new values according to the converted result. In this regard, preferably the aligner 422 selects a specific one of the W, R, G and B data of the input WRGB data that has the lowest data value, to be converted into 0. Then the aligner 422 changes or lowers the value of each of the other data (non-selected) of the input WRGB data by the same amount of the data value of the specific selected one of the W, R, G and B data. For instance, assume that the W, R, G and B data of the input WRGB data in one example have 10, 14, 4, 18 data values, respectively. Then the aligner 422 selects the G data having the lowest data value of 4 and converts it to have a 0 value. Further the aligner 422 decreases each of the other data (W, R and B data) of the input WRGB data by the value 4 (the value of the G data) to be 6, 10 and 14, respectively. Thus the W, R, G and B data of the conversion WRGB data have 6, 10, 0 and 14 data values, respectively. As a result, the aligner 422 generates the conversion WRGB data based on the input WRGB data.

Further the aligner 422 also generates re-alignment information which indicates the amount of data value by which each of the W, R, G and B data of the input WRGB data has been decreased. For instance, in the above example, the re-alignment information indicates the data value 4, which was the decreased amount of the data value for each data of the input WRGB data. The aligner 422 transmits the re-alignment information (e.g., value 4) to the controller 424. The controller 424 can temporarily store the re-alignment information to be used by the re-aligner 426 for converting the conversion WRGB data back to the digital WRGB data (input WRGB data). In another example, the controller 424 can send the re-alignment information to the external memory 500 for temporary storage along with the location information, which then can be used later by the re-aligner 426 for converting the conversion WRGB data back to the digital WRGB data (input WRGB data).

Moreover, the aligner 422 generates location information indicating the data that has been converted into 0. The conversion WRGB data thus can include this location information, which includes (i) information on three pieces of data among the W, R, G, and B data and/or (ii) information on the data converted into 0.

For example, the aligner 422 may convert at least one data of the input WRGB data as shown in the portion (B) of FIG. 5 into 0 as shown in a portion (C) of FIG. 5. In the example of the portion (C) of FIG. 5, the G data of the input WRGB data has been converted into zero (0), e.g., since the G data has the lowest data value among the W, R, G and B data of the input WRGB data. In this case, the aligner 422 also changes or lowers the levels of the other remaining W, R, and B data of the input WRGB data by the same amount as the value of the G data as discussed above, for keeping pace with the converting of the G data into 0. Also, the aligner 422 generates location information indicating that the G data has been converted into 0.

The above-described embodiment of the present invention will be described in detail with reference to Table 1.

TABLE 1

| Case | DT [31:22] | DT [21:12] | DT [11:2] | DT [1:0] |
|---|---|---|---|---|
| R = 0 | W [9:0] | G [9:0] | B [9:0] | 01 |
| G = 0 | R [9:0] | W [9:0] | B [9:0] | 10 |
| B = 0 | R [9:0] | G [9:0] | W [9:0] | 11 |
| W = 0 | R [9:0] | G [9:0] | B [9:0] | 00 |

In a first example, as listed in a first case line (line shown as R=0) of Table 1, the aligner 422 may convert R data among the W, R, G, and B data composing the input WRGB data into 0, and generate the corresponding location information having a value of '01'. Here, the location information having the value of '01' indicates that the R data has been converted into 0. In Table 1, DT stands for data, and [31:22] or the like indicates the data bit location among the total data bit size. For instance, [31:22] indicates a $23^{rd}$ bit to a $32^{nd}$ bit among 32 bits of data.

In a second example, as listed in a second case line (line shown as G=0) of Table 1, the aligner 422 may convert G data among the W, R, G, and B data composing the input WRGB data into 0, and generate the corresponding location information having a value of '10'. Here, the location information having the value of '10' indicates that the G data has been converted into 0.

In a third example, as listed in at third case line (line shown as B=0) of Table 1, the aligner 422 may convert B data among the W, R, G, and B data composing the input WRGB data into 0, and generate the corresponding location information having a value of '11'. Here, the location information having the value of '11' indicates that the B data has been converted into 0.

In a fourth example, as listed in a fourth case line (line shown as W=0) of Table 1, the aligner 422 may convert W data among the W, R, G, and B data composing the input WRGB data into 0, and generate location information having a value of '00'. Here, the location information having the value of '00' indicates that the W data has been converted into 0.

The conversion WRGB data, which include only the three remaining pieces of data among the W, R, G, and B data composing the input WRGB data and the location information, are generated through the above-described conversion operation.

In this case, when the input WRGB data (per port) are composed of a total of 40 bits including 10 bits of the W data, 10 bits of the R data, 10 bits of the G data, and 10 bits of the B data, according to the present invention the conversion WRGB data are then generated and are composed of a total of 32 bits (per port) including 30 bits of three data and 2 bits of the location information indicating the data that has been converted to 0. That is, according to the present invention, when each of the W, R, G and B data of the input WRGB data has N bits where N equals a positive integer, the aligner 422 converts one of the W, R, G, and B data into 0, converts the other remaining data of the W, R, G and B data into new values according to this conversion result, and generates 2-bit location information indicating the one data converted into 0, thereby generating the conversion WRGB data of ((N×3)+2) bits. In the above example where N=10, the conversion WRGB data has 32 bits (32=(10×3)+2).

Therefore, the conversion WRGB data may be composed of bits less than those of the input WRGB data.

An example of four communication ports being used where 40-bit input WRGB data is received in each of the four ports will now be discussed. As illustrated in FIG. 7, when the 40-bit input WRGB data composed of 10-bit W, R, G, and B data are received from the converter 421 to the aligner 422 through each of the four ports, the aligner 422 generates the conversion WRGB data composed of 32 bits including 30 bits of three data among the W, R, G, and B data and 2 bits of the corresponding location information for each of the four ports. In this case, the aligner 422 is driven with the data clock for driving the input WRGB data. The 32-bit conversion WRGB data from each of the four ports are then transferred to the front internal memory 423 through the four ports.

The front internal memory 423 is disposed between the aligner 422 and the controller 424. The front internal memory 423 receives the conversion WRGB data corresponding to the number of communication ports between the external system and the reception unit 410 from the aligner 422, stores the received conversion WRGB data, and transfers the stored conversion WRGB data to the controller 424.

As illustrated in FIG. 7, when the number of communication ports between the external system and the reception unit 410 is four as discussed above, the front internal memory 423 receives four pieces of the conversion WRGB data from the aligner 422 respectively through the four ports. Therefore, a total of 128 bits (32 bits×4=128 bits) are received from the aligner 422 to the front internal memory 423.

The front internal memory 423, as illustrated in FIG. 7, uses the data clock for driving the received input WRGB data. Also, the front internal memory 423 transfers the received 128-bit data to the controller 424 at a frequency corresponding to one-fourth of an external memory clock frequency that is used for data communication between the controller 424 and the external memory 500.

In the below description, it can be seen that the external memory clock frequency is 340 MHz. Thus, the front internal memory 423 may transfer the 128-bit data to the controller 424 at a frequency of 85 MHz (340 MHz÷4=85 MHz). The frequency may be generated by a frequency generation unit 428 of the timing controller 400.

The controller 424 transfers or receives the conversion WRGB data, corresponding to the number of communication ports between the external system and the reception unit 410, to or from the external memory 500.

For example, as described above, when the number of communication ports between the external system and the reception unit 410 is four, the controller 424 receives the conversion WRGB data from each of the four ports from the front internal memory 423.

Moreover, the controller 424 transfers the bits of the conversion WRGB data received from the front internal memory 423 to the external memory 500. In this case, the controller 424 and the external memory 500 transfer the bits of data in unit of 16 bits to each other.

When the number of communication ports between the external system and the reception unit 410 is four, as illustrated in FIG. 7, the controller 424 receives 128 bits corresponding to the four sets of the conversion WRGB data respectively composed of 32 bits from the front internal memory 423, and sequentially transfers the 128 bits in units of 16 bits to the external memory 500. Alternatively, the controller 424 sequentially receives the 128 bits in units of 16 bits from the external memory 500. That is, according to the present invention, when the number of communication ports between the external device/system and the reception unit 410 is M where M is a positive integer, the controller 424 sequentially transfers or receives (M×((N×3)+2)) bits based on the conversion WRGB data from each port, to or from the external memory 500. In the above example where M=4, the controller 424 transfers or receives 128 bits (128=4×((10×3)+2)) to or from the external memory 500.

As illustrated in FIG. 7, when each of the four sets of the conversion WRGB data received by the first internal memory 423 is composed of 32 bits and the 128 bits included in the four sets of the conversion WRGB data are by the controller 424, 16-bit data is transferred between the controller 424 and the external memory 500. In that case, eight clocks are necessary for transferring and receiving the 128-bit data. This is because 128 divided by 16 is 8.

However, as shown in FIG. 6, data are transferred and received between the controller 424 and the external memory 500 through two lines, and thus, a total of four data clocks are needed for transferring and receiving the 128-bit data in 16 bits through the two lines. That is, 8 divided by 2 is 4, which denotes the four data clocks.

As described above, a maximum of 85 MHz is needed for transferring and receiving one data clock and four data clocks are necessary for transferring and receiving the 128-bit data between the controller 424 and the external memory 500. Therefore, as shown in FIG. 6, a frequency of a maximum of 340 MHz (=85 MHz×4) is needed according to the present invention.

As is known, an available data clock for the external memory 500 is currently a maximum of 400 MHz. Then using the present invention, the data may be transferred between the controller 424 and the external memory 500, within a range from 340 MHz to 400 MHz, which would be well within the current specification of the external memory 500.

According to an example of the present invention, the conversion WRGB data may be transferred between the controller 424 and the external memory 500, within the maximum data clock frequency (400 MHz).

To provide an additional description, when the number of communication ports between the external system and the reception unit 410 is four as was discussed in the above examples, and the W, R, G, and B data are respectively composed of 10 bits, then according to the present invention the conversion WRGB data are composed of 32 bits per port, and the controller 424 and the external memory 500 perform the 16-bit communication of the 128 bits corresponding to the four sets of the conversion WRGB data with each other by using four data clocks.

Further the controller 424 and the external memory 500 can be driven at 340 MHz, which is well within a range of 400 MHz corresponding to the maximum frequency of the external memory 500. Accordingly, the external memory 500 may properly exchange the data with the controller 424.

In addition to the above-described functions, the controller 424 may also convert the conversion WRGB data transferred from the front internal memory 423 into various formats.

Through various algorithms, for example, an operation of improving an image realized with the conversion WRGB data may be performed, an operation of correcting an image may be performed, and an operation of removing noise may be performed.

However, the conversion operation may be performed by an element other than the controller 424. For example, the conversion operation may be performed by at least one of the converter 421, the aligner 422, and the re-aligner 426, or performed by another element (not shown) included in the timing controller 400.

The rear internal memory 425 receives data of total 128 bits from the controller 424 which have been retrieved from the external memory 500, and converts the 128 bits into 32-bit conversion WRGB data such that the received data are transferred to the re-aligner 426 through four ports. That is, the rear internal memory 425 performs a reverse function of the front internal memory 423.

The re-aligner 426 performs a reverse function of the aligner 422 using the location information and the re-alignment information. In detail, the re-aligner 426 converts the conversion WRGB data, including only three pieces of data among the W, R, G, and B data and the corresponding location information (which have been obtained from the external memory 500 through the controller 424 and the rear internal memory 425), into the WRGB data including 10-bit W, R, G, and B data (re-aligned WRGB data), i.e., into the input WRGB data using the location information and the re-alignment information. The location information identifies the specific data among the W, R, G and B data that has been previously changed to 0, and the re-alignment information indicates the decreased amount of data value for the other data (excluding the specific data) among the W, R, G and B data. Thus using these pieces of information, the re-aligner 426 can generate the input WRGB data from the conversion WRGB data.

The transmitter 427 then transfers the re-aligned WRGB data outputted from the re-aligner 426 to the source driver IC 300. The re-aligned WRGB data (digital WRGB data) are the same as the input WRGB data output from the converter 421.

As described above, the present invention optimizes WRGB data, thus decreasing the capacity of the internal memories (internal SRAMs) 423 and 425 and reducing the frequency of the external memory 500. Accordingly, according to the present invention, the external memory 500 can stably operate with a sufficient frequency margin, namely, a frequency margin between 340 MHz and 400 MHz.

As described above, the present invention converts input RGB data into input WRGB data, generates conversion WRGB data including a plurality of data (which are generated by converting one of W, R, G, and B data composing the input WRGB data into 0) and location information of the data which has been converted into 0, and transfer the conversion WRGB data to the external memory, thus decreasing the internal logic size of the timing controller.

Moreover, the present invention converts 120-bit input RGB data into 128-bit conversion WRGB data and communicates the same with the external memory, thus decreasing the internal logic size of the timing controller.

Moreover, the present invention reduces the frequency of the external memory, and secures the frequency margin of the external memory, thus enabling the stable operation of the external memory.

In addition, according to the present invention, there is no need to separately set a data clock range for processing WRGB data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A timing controller for use in a display device including an external memory, the timing controller comprising:
    a reception unit configured to receive input RGB data from an external device;
    a converter configured to convert the input RGB data into input WRGB data composed of W, R, G and B data;
    an aligner configured to convert one of the W, R, G, and B data of the input WRGB data into 0 to generate conversion WRGB data, the conversion WRGB data having bits less than the total number of bits composing the W, R, G, and B data;
    a controller configured to transfer the conversion WRGB data to the external memory; and
    a re-aligner configured to receive the conversion WRGB data from the external memory, convert the received conversion WRGB data into digital WRGB data corresponding to the input WRGB data, and to output the digital WRGB data,
    wherein when each of the W, R, G and B data of the input WRGB data has N bits where N equals a positive integer, the aligner converts the one of the W, R, G, and B data into 0, converts the other remaining data of the W, R, G and B data into new values according to this conversion result, and generates 2-bit location information indicating the one data converted into 0, thereby generating the conversion WRGB data of ((N×3)+2) bits.

2. The timing controller of claim 1, wherein when the aligner converts the one of the W, R, G, and B data into 0, the aligner also converts the remaining data of the W, R, G, and B data into new values according to this conversion result, and generates location information indicating the one data converted into 0.

3. The timing controller of claim 2, wherein the conversion WRGB data includes the converted remaining data of the W, R, G, and B and the location information.

4. The timing controller of claim 1, wherein when a number of communication ports between the external device and the reception unit is M where M is a positive integer, the controller sequentially transfers or receives (M×((N×3)+2)) bits based on the conversion WRGB data from each port, to or from the external memory.

5. The timing controller of claim 1, further comprising:
    a front internal memory disposed between the aligner and the controller, and configured to:
    receive the conversion WRGB data, corresponding to a number of communication ports between the external device and the reception unit, from the aligner,
    store the received conversion WRGB data, and
    transfer the stored conversion WRGB data to the controller.

6. The timing controller of claim 1, further comprising:
    a rear internal memory disposed between the controller and the re-aligner, and configured to:
    receive the conversion WRGB data, corresponding to a number of communication ports between the external device and the reception unit, from the controller,
    store the received conversion WRGB data, and
    transfer the stored conversion WRGB data to the re-aligner.

7. The timing controller of claim 1, wherein the aligner generates realignment information which indicates a data value of the one of the W, R, G and B data of the input WRGB data before the one data is converted to 0, and the re-aligner converts the received conversion WRGB data into the digital WRGB data using the re-alignment information.

8. The timing controller of claim 7, wherein when the aligner converts the one of the W, R, G, and B data into 0, the aligner also generates location information indicating the one data converted into 0, and the re-aligner converts the received conversion WRGB data into the digital WRGB data using the location information and the re-alignment information.

9. The timing controller of claim 1, wherein when the number of communication ports between the external device and the reception unit is four, the W, R, G, and B data of the input WRGB data are each respectively composed of 10 bits, the conversion WRGB data are composed of 32 bits for each port, and the controller and the external memory perform a 16-bit communication where 128 bits corresponding to the four conversion WRGB data are transferred between the controller and the external memory by using four data clocks.

10. A timing controller for use in a display device including an external memory, the timing controller comprising:
    a reception unit configured to receive input RGB data from an external device;
    a converter configured to convert the input RGB data into input WRGB data composed of W, R, G and B data each having N bits, where N is a positive integer;
    an aligner configured to convert the input WRGB data into conversion WRGB data, the conversion WRGB data having a total of ((3×N)+2) bits;
    a controller configured to transfer the conversion WRGB data to the external memory; and
    a re-aligner configured to receive the conversion WRGB data from the external memory, convert the received conversion WRGB data into digital WRGB data corresponding to the input WRGB data, and to output the digital WRGB data, wherein the aligner converts one of the W, R, G, and B data into 0, converts the remaining data of the W, R, G, and B data into new values according to this conversion result, and generates location information indicating the one data converted into 0.

11. The timing controller of claim 10, wherein the conversion WRGB data has 2 bits among the total of ((3×N)+2) bits, and said 2 bits indicate which data among the W, R, G and B data of the input WRGB has been changed to 0.

12. The timing controller of claim 10, wherein the conversion WRGB data includes the converted remaining data of the W, R, G, and B and the location information.

13. The timing controller of claim 10, wherein when a number of communication ports between the external device and the reception unit is M where M is a positive integer, the controller sequentially transfers or receives (M×((N×3)+2)) bits based on the conversion WRGB data from each port, to or from the external memory.

14. The timing controller of claim 10, further comprising:
a front internal memory disposed between the aligner and the controller, and configured to:
receive the conversion WRGB data, corresponding to a number of communication ports between the external device and the reception unit, from the aligner,
store the received conversion WRGB data, and
transfer the stored conversion WRGB data to the controller.

15. The timing controller of claim 10, further comprising:
a rear internal memory disposed between the controller and the re-aligner, and configured to:
receive the conversion WRGB data, corresponding to a number of communication ports between the external device and the reception unit, from the controller,
store the received conversion WRGB data, and
transfer the stored conversion WRGB data to the re-aligner.

16. The timing controller of claim 10, wherein the aligner converts one of the W, R, G, and B data into 0, and generates re-alignment information which indicates a data value of the one of the W, R, G and B data of the input WRGB data before the one data is converted to 0, and the re-aligner converts the received conversion WRGB data into the digital WRGB data using the re-alignment information.

17. The timing controller of claim 16, wherein when the aligner converts the one of the W, R, G, and B data into 0, the aligner also generates location information indicating the one data converted into 0, and the re-aligner converts the received conversion WRGB data into the digital WRGB data using the location information and the re-alignment information.

18. The timing controller of claim 10, wherein when a number of communication ports between the external device and the reception unit is four, the W, R, G, and B data of the input WRGB data are each respectively composed of 10 bits, the conversion WRGB data are composed of 32 bits for each port, and the controller and the external memory perform a 16-bit communication where 128 bits corresponding to the four conversion WRGB data are transferred between the controller and the external memory by using four data clocks.

* * * * *